(12) United States Patent
Günthner et al.

(10) Patent No.: US 9,689,675 B2
(45) Date of Patent: Jun. 27, 2017

(54) SENSOR FOR DETECTING A ROTATION RATE OF AN OBJECT

(71) Applicant: Continental Teves AG & Co. oHG, Frankfurt (DE)

(72) Inventors: Stefan Günthner, Frankfurt am Main (DE); Bernhard Schmid, Friedberg (DE); Jasmin Lohmann, Brombachtal (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/653,461

(22) PCT Filed: Dec. 13, 2013

(86) PCT No.: PCT/EP2013/076498
§ 371 (c)(1),
(2) Date: Jun. 18, 2015

(87) PCT Pub. No.: WO2014/095607
PCT Pub. Date: Jun. 26, 2014

(65) Prior Publication Data
US 2015/0345948 A1 Dec. 3, 2015

(30) Foreign Application Priority Data
Dec. 20, 2012 (DE) .......................... 10 2012 224 081

(51) Int. Cl.
*G01C 19/5726* (2012.01)
*G01C 19/5719* (2012.01)

(52) U.S. Cl.
CPC ..... *G01C 19/5719* (2013.01); *G01C 19/5726* (2013.01)

(58) Field of Classification Search
CPC ............ G01C 19/5719; G01C 19/5726; G01C 19/574; G01C 19/5642
(Continued)

(56) References Cited

U.S. PATENT DOCUMENTS 3,253,471 A 5/1966 Maillard
6,467,349 B1 * 10/2002 Andersson ......... G01C 19/5656
73/504.14

(Continued)

FOREIGN PATENT DOCUMENTS

DE  1523147    3/1970
DE  10155667   1/2003
(Continued)

OTHER PUBLICATIONS

German Search Report for German Application No. 10 2012 224 081.0 mailed Sep. 5, 2013, including partial translation.
(Continued)

*Primary Examiner* — Helen Kwok
(74) *Attorney, Agent, or Firm* — RatnerPrestia

(57) ABSTRACT

A sensor for detecting a rotation rate of an object, including: a sensor element, which is designed to vibrate at an angle to the rotation axis of the rotation rate to be detected at an excitation frequency on a resetting element fastened in a spatially fixed manner to the object, such that the sensor element is deflected at a reaction frequency in a reaction direction at an angle to the rotation axis and at an angle to the vibration direction owing to the Coriolis force; and a measuring transducer, which is designed to detect the vibration in the reaction direction wherein the vibratable sensor element is formed in such a manner that a comparison of a temperature-dependent displacement of a frequency spacing between the excitation frequency and the reaction frequency (Continued)

and a temperature-dependent position of the sensor element on the object satisfies a predefined condition.

11 Claims, 3 Drawing Sheets

(58) Field of Classification Search
USPC .......................... 73/504.12, 504.02, 504.04
See application file for complete search history.

(56) References Cited

U.S. PATENT DOCUMENTS

| | | | |
|---|---|---|---|
| 6,874,349 B2 | 4/2005 | Mattes | |
| 6,997,054 B2 | 2/2006 | Tsugai | |
| 7,250,773 B2 | 7/2007 | Takekawa | |
| 7,444,868 B2* | 11/2008 | Johnson | G01C 19/5719 73/504.12 |
| 7,520,169 B2 | 4/2009 | Schwarzelbach | |
| 8,794,047 B2 | 8/2014 | Gunthner | |
| 8,794,067 B2 | 8/2014 | Schmid | |
| 9,014,921 B2 | 4/2015 | Bretzigheimer | |
| 2004/0231418 A1* | 11/2004 | Jeong | G01C 19/5642 73/504.08 |
| 2008/0257042 A1* | 10/2008 | Tateyama | G01C 19/5607 73/504.12 |
| 2010/0037690 A1* | 2/2010 | Gunthner | G01C 19/5712 73/504.04 |
| 2010/0236327 A1* | 9/2010 | Mao | G01C 19/5719 73/504.12 |
| 2012/0048016 A1* | 3/2012 | Schmid | G01C 19/574 73/498 |
| 2012/0279301 A1* | 11/2012 | Gunthner | G01C 19/574 73/504.12 |
| 2013/0197858 A1 | 8/2013 | Egretzberger | |
| 2015/0345948 A1* | 12/2015 | Gunthner | G01C 19/5719 73/504.12 |

FOREIGN PATENT DOCUMENTS

| | | |
|---|---|---|
| DE | 102004024050 | 12/2004 |
| DE | 102010002796 | 9/2010 |
| DE | 102009019318 | 3/2011 |
| DE | 102011005745 | 9/2011 |
| DE | 102011080789 | 2/2012 |
| EP | 1645847 | 4/2006 |
| WO | 2005098358 | 10/2005 |

OTHER PUBLICATIONS

International Search Report for International Application No. PCT/EP2013/076498 mailed Mar. 3, 2014.

* cited by examiner

SENSOR FOR DETECTING A ROTATION RATE OF AN OBJECT

CROSS REFERENCE TO RELATED APPLICATIONS

This application is the U.S. National Phase Application of PCT/EP2013/076498, filed Dec. 13, 2013, which claims priority to German Patent Application No. 10 2012 224 081.0, filed Dec. 20, 2012, the contents of such applications being incorporated by reference herein.

FIELD OF THE INVENTION

The invention relates to a sensor for detecting a rotation rate of an object, a method for detecting a rotation rate of an object, a control device for carrying out the method, and a vehicle.

BACKGROUND OF THE INVENTION

A rotation rate sensor for detecting a yaw rate and a pitch rate of a vehicle is known from DE 10 2010 002 796 A1, which is incorporated by reference. The rotation rate sensor comprises an encoder element, which is configured to oscillate at an angle to the axis of rotation of the rotation rate to be detected at an excitation frequency on a restoring element, which is fastened in a stationary manner on the object, so that the encoder element is deflected, as a result of the Coriolis force, at an angle to the axis of rotation and at an angle to the oscillation direction in a reaction direction at a reaction frequency. In this case, a measurement pickup is configured to detect the oscillation in a reaction direction, so that the rotation rate can be detected based on the detected oscillation, because it is dependent on the detected oscillation.

SUMMARY OF THE INVENTION

An aspect of the present invention improves this circuit of the current sensors in series between power source and consumer.

According to one aspect of the invention, a sensor for detecting a rotation rate of an object comprises an encoder element, which is configured to oscillate at an angle to the axis of rotation of the rotation rate to be detected at an excitation frequency on a restoring element, which is fastened in a stationary manner on the object, so that the encoder element is deflected, as a result of the Coriolis force, at an angle to the axis of rotation and at an angle to the oscillation direction in a reaction direction at a reaction frequency, and a measurement pickup, which is configured to detect the oscillation in a reaction direction. In this case, the oscillatory encoder element is designed such that a comparison of a temperature-dependent shift of a frequency interval between the excitation frequency and the reaction frequency and a temperature-dependent location of the encoder element on the object meets a predetermined condition.

The measurement pickup can directly detect the oscillation of the encoder element in the reaction direction. Alternatively, the encoder element could also be coupled to a further mass, however, which is excited to oscillate in the reaction direction by the encoder element. The measurement pickup could then detect the oscillation of this second mass. As long as no excitation takes place in the reaction direction, this second mass could then optionally be stationary.

The specified sensor is based on the consideration that the oscillation of the encoder element caused by the Coriolis force at an angle to the excited oscillation at the excitation frequency is subject to temperature effects, which results in an incorrect detection of the rotation rate of the object originating from the oscillation caused by the Coriolis force.

However, it is recognized in the scope of the specified sensor that the temperature effects are essentially induced by two different mechanical effects. On the one hand, temperature-related heat movements in the object result in mechanical tensions, which have an influence on the location of the encoder element in relation to the object, which finally results in a different oscillation and therefore corruption of the rotation rate to be detected. On the other hand, the temperature also has an influence on the frequency of the oscillation of the encoder element caused by the Coriolis force, which also results in a different oscillation and therefore corruption of the rotation rate to be detected.

Based on this finding, the specified sensor is based on the idea of reconciling the two above-mentioned temperature-related effects with one another, so that in total they still result in a change of the oscillation of the encoder element and therefore corruption of the rotation rate, but the reconciliation is to be carried out such that the oscillation of the encoder element is temperature-independent as a whole. The corruption could therefore be determined beforehand and taken into consideration during the analysis of the oscillation and therefore during the determination of the rotation rate.

In the scope of this idea, various determining factors are available in the specified sensor, to set the predetermined condition. These determining factors can comprise, for example, the mass of the encoder element, the spring stiffness of the restoring element, the relative location of the encoder element, for example, in relation to the axis of rotation, or arbitrary other adjustable system parameters in the specified sensor. The fulfillment of the condition can be verified, for example, by suitable dimensioning beforehand, by simulations beforehand, or by test experiments using prototypes.

In a refinement of the specified sensor, the predetermined condition comprises an observation of the comparison in an approximation. The approximation can comprise, for example, a linearization, a series expansion, or another arbitrary simplification of the comparison of the temperature-dependent shift of the frequency interval between the excitation frequency and the reaction frequency and the temperature-dependent location of the encoder element on the object. In this manner, the above-mentioned reconciliation of the spring constant to the remaining components of the specified sensor can be substantially simplified. In this case, the simplification can be based on the analytical expressions known to a person skilled in the art for the temperature-dependent shift of the frequency interval between the excitation frequency and the reaction frequency and for the temperature-dependent location of the encoder element.

In a special refinement of the specified sensor, the predetermined condition comprises an error interval, in which the comparison, in particular the approximated comparison, must fall within a predetermined temperature range. That is to say, in the scope of the specified sensor, complete temperature independence is not achieved, but the temperature dependence of the rotation rate determinable using the specified sensor can be specified with a defined tolerance range, whereby the specified sensor can be selected specifically for an application, because the tolerance range is known.

In another refinement of the specified sensor, the encoder element is a capacitance electrode, which oscillates in the reaction direction in relation to a further capacitance electrode, wherein the measurement pickup is configured to detect the oscillation in the reaction direction based on a capacitance between the two capacitance electrodes. In this manner, the oscillation can be electrically detected via the capacitance in a simple manner.

In a special refinement of the specified sensor, the restoring element has a spring constant, which is dependent on an electrical voltage between the two capacitance electrodes. The voltage can soften the spring in a manner known per se in this case, which is known to a person skilled in the art under the term "spring softening" effect.

In a preferred refinement of the specified sensor, the voltage is set such that the comparison meets the predetermined condition. That is to say, the voltage between the capacitance electrodes represents a further of the determining factors listed above as examples, to meet the condition mentioned at the outset.

In a particularly preferred refinement of the specified sensor, the reaction oscillation induces a change $\Delta C$ of the capacitance between the two capacitance electrodes with $\Delta f$ as the frequency interval, $\Omega$ as the rotation rate, $x_0$ as the amplitude of the oscillation at the excitation frequency, d as the spacing of the capacitance electrodes, and $C_s(0)$ as the open-circuit capacitance between the two capacitance electrodes, which meets the following condition in a first approximation $$\Delta \hat{C} \approx \frac{\Omega x_0}{2\pi \Delta f d} C_s(0),$$

wherein, as a predetermined condition, the term $$\frac{C_S(0)}{\Delta f d}$$

is less in a predetermined temperature range than a predetermined error threshold. In this manner, it can be detected by computation beforehand whether the above-mentioned predetermined condition is fulfilled or not.

According to a further aspect of the invention, a method for detecting a rotation rate of an object using an encoder element, which is configured to oscillate at an angle to the axis of rotation of the rotation rate to be detected at an excitation frequency on a restoring element, which is fastened in a stationary manner on the object, so that the encoder element is deflected, as a result of the Coriolis force, at an angle to the axis of rotation and at an angle to the oscillation direction in a reaction direction at a reaction frequency, comprises the steps of detecting the oscillation in the reaction direction, determining the rotation rate based on the detected oscillation, and setting a spring constant of the restoring element such that a comparison of a temperature-dependent shift of a frequency interval between the excitation frequency and the reaction frequency and a temperature-dependent location of the encoder element on the object meets a predetermined condition.

The specified method can be restricted by steps which correspond in meaning to the features of the dependent claims of the specified sensor.

According to a further aspect of the invention, a control device is configured to carry out a method as claimed in any one of the preceding claims.

In a refinement of the specified control device, the specified device has a memory and a processor. In this case, the specified method is stored in the form of a computer program in the memory and the processor is provided for executing the method when the computer program is loaded from the memory into the processor.

According to a further aspect of the invention, a computer program comprises program code means to carry out all steps of one of the specified methods when the computer program is executed on a computer or one of the specified devices.

According to a further aspect of the invention, a computer program product contains a program code, which is stored on a computer-readable data carrier and which, when it is executed on a data processing unit, carries out one of the specified methods.

According to a further aspect of the invention, a rotation rate sensor comprises a specified control device.

According to a further aspect of the invention, a vehicle comprises a specified control device and/or a specified rotation rate sensor.

BRIEF DESCRIPTION OF THE DRAWINGS

The above-described properties, features, and advantages of this invention and the manner in which they are achieved will become more clear and comprehensible in conjunction with the following description of the exemplary embodiments, which are explained in greater detail in conjunction with the drawings, wherein.

DETAILED DESCRIPTION OF THE INVENTION

In the figures, identical technical elements are provided with identical reference signs and are only described once.

Figure 1:
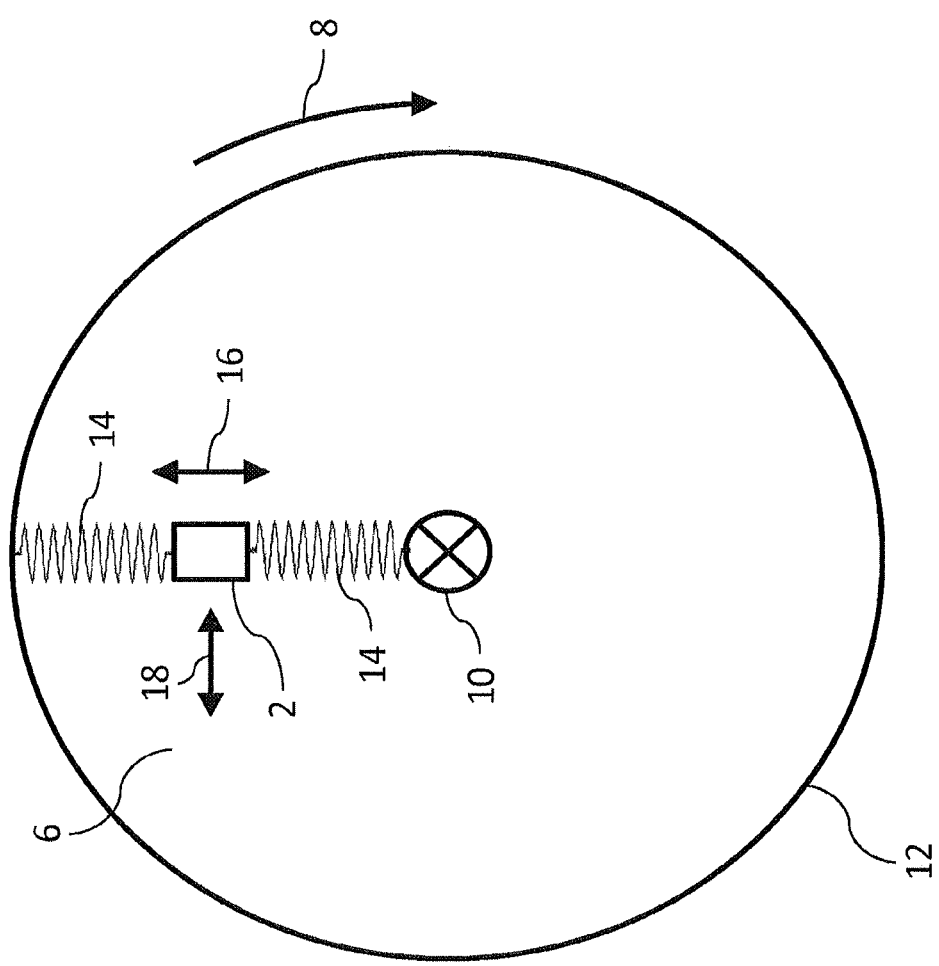
FIG. 1 shows a diagram to illustrate the Coriolis effect on an oscillating mass.

Reference is made to FIG. 1, which shows a diagram to illustrate the Coriolis effect on an oscillating mass 2.

The oscillating mass 2 will be used at a later point as an encoder element 2 for a rotation rate sensor 4, which will be described in greater detail in the scope of FIGS. 2 and 3.

As is known per se, the Coriolis effect acts in rotating systems, such as the disk 6 shown in FIG. 1, which is to rotate at an angular velocity 8. The encoder element 2 is fastened between an axis of rotation 10 and an external circumference 12 of the disk 6 via two springs 14 as restoring elements 14. Therefore, the encoder element 2 also rotates on the rotating disk 6.

The Coriolis effect states in a manner known per se that when a linear movement 16 of the encoder element 2 is observed perpendicularly to the axis of rotation 10 from a system at rest in relation to the rotating disk 6, the encoder element must apply a force perpendicularly to the movement 16 and perpendicularly to the axis of rotation 10 to maintain this linear movement 16. If this force is not applied, the encoder element 2 is then moved perpendicularly to the movement 16 and perpendicularly to the axis of rotation 10 with a Coriolis force 18.

This Coriolis force 18 is used in the rotation rate sensor 4 to detect the angular velocity 8 of, for example, the rotating disk 6, since the Coriolis force 18 is dependent in a manner known per se on the movement 16 and the angular velocity 8. To measure the angular velocity 8, the encoder element 2, which is held via the restoring elements 14 on the rotating disk 6, is excited in a defined manner into an oscillating movement 16. Due to the oscillating, periodically reversing movement 16, the Coriolis force 18 also periodically reverses, and causes the encoder element 18 to oscillate perpendicularly to the movement 16 and perpendicularly to the axis of rotation 10. The oscillation of the encoder element 2 in the direction of the Coriolis force 18, which is therefore dependent on the angular velocity 8, is detected in the rotation rate sensor 4 and used to determine the angular velocity 8 in a manner known per se, as is explained, for example, in document DE 10 2010 002 796 A1.

Before the rotation rate sensor 4 will be described in greater detail, an exemplary embodiment for the rotation rate sensor 4 is to be shown.

Figure 2:
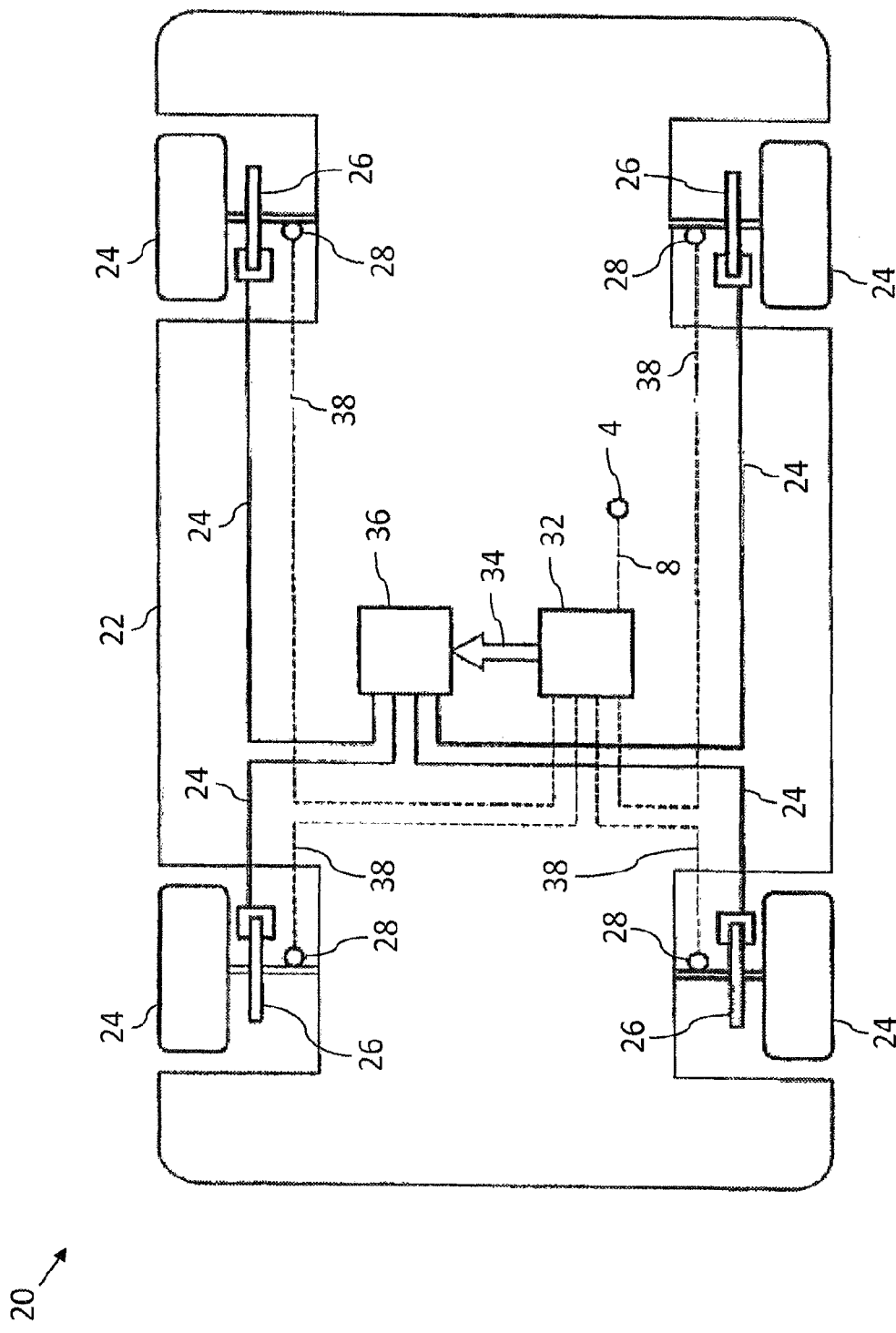
FIG. 2 shows a schematic circuit diagram of a vehicle having a rotation rate sensor.

Reference is made to FIG. 2, which shows a schematic view of a vehicle 20 having a vehicle dynamics controller known per se. Details of this vehicle dynamics controller can be inferred, for example, from DE 10 2011 080 789 A1, which is incorporated by reference.

The vehicle 20 comprises a chassis 22 and four wheels 24. Each wheel 24 can be decelerated in relation to the chassis 22 via a brake 26, which is fastened in a stationary manner on the chassis 22, to decelerate a movement of the vehicle 20 on a road (not shown in greater detail).

In this case, it can occur in a manner known to a person skilled in the art that the wheels 24 of the vehicle 20 lose their ground adhesion and the vehicle 20 even moves away from a trajectory, which is predefined, for example, via a steering wheel (not shown in greater detail), due to understeer or oversteer. This is prevented by control circuits known per se such as ABS (antilock braking systems) and ESP (electronic stability programs).

In the present embodiment, the vehicle 20 has speed sensors 28 on the wheels 24 for this purpose, which detect a speed 30 of the wheels 24. Furthermore, the vehicle 20 has the rotation rate sensor 4, which, for example, can output the yaw rate of the vehicle 20 as an angular velocity 8, for example. As explained in DE 10 2010 002 796 A1, which is incorporated by reference, the rotation rate sensor can detect up to two rotation rates of the vehicle 20 and thus, for example, also output the pitch rate or the roll rate of the vehicle, depending on the direction in which the oscillating movement 16, which is shown in FIG. 1, of the encoder element 2 is excited.

Based on the detected speeds 30 and the angular velocity 8, which is formed as the yaw rate, a controller 32 can determine, in a manner known to those skilled in the art, whether the vehicle 20 is slipping on the roadway or even deviating from the above-mentioned predefined trajectory and can react accordingly thereto using a controller output signal 34 known per se. The controller output signal 34 can then be used by a positioning unit 36 to activate actuators, such as the brakes 26, by means of positioning signals 38, these actuators reacting to the slipping and the deviation from the predefined trajectory in a manner known per se.

The controller 32 can be integrated, for example, in an engine controller, which is known per se, of the vehicle 20. The controller 32 and the positioning unit 36 can also be designed as a shared control unit and can optionally be integrated in the above-mentioned engine controller.

Figure 3:
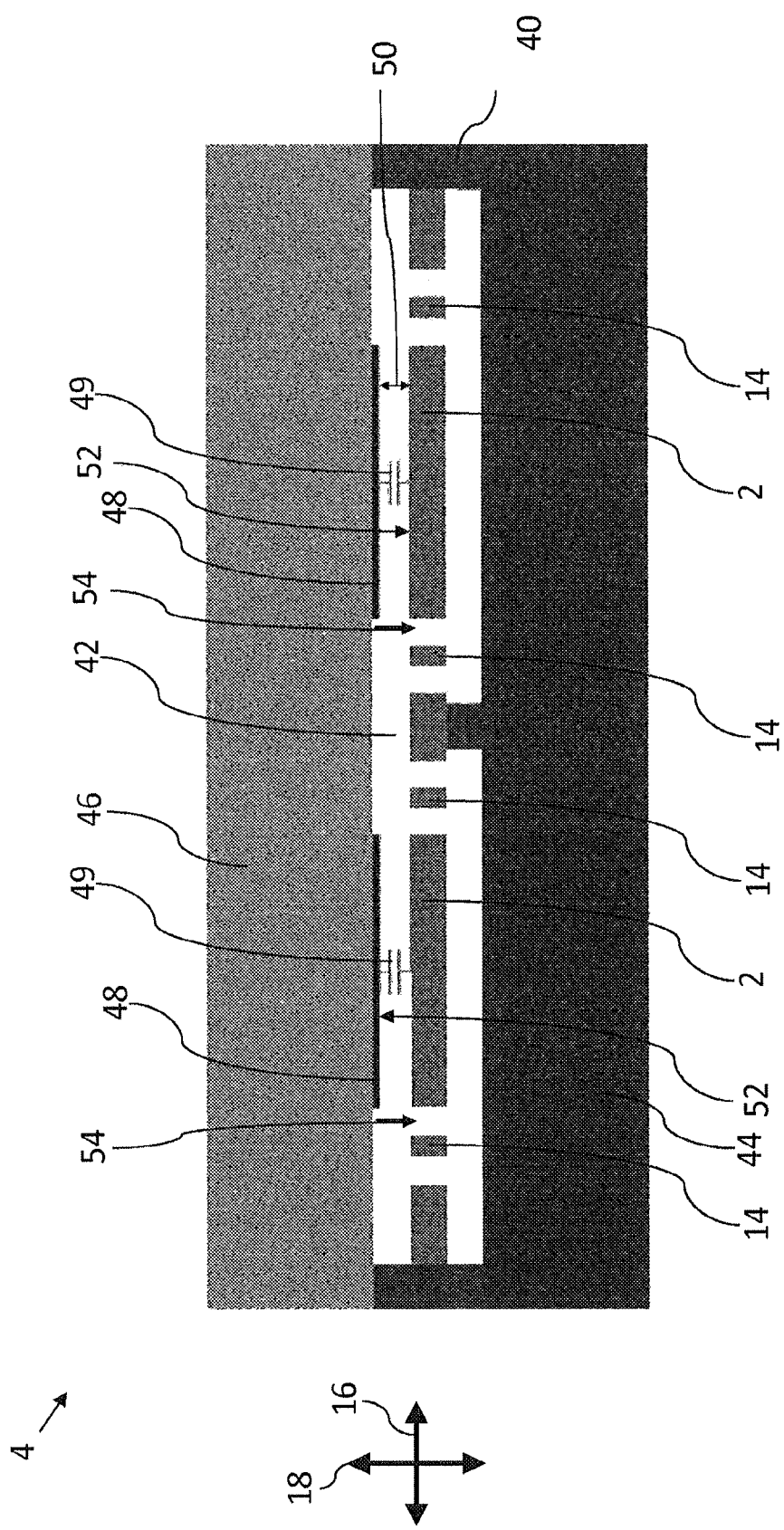
FIG. 3 shows a schematic circuit diagram of the rotation rate sensor from FIG. 2.

Reference is made to FIG. 3, which shows a schematic view of the rotation rate sensor 4, which is designed as a micromechanical sensor.

The rotation rate sensor 4 comprises a housing 40, which encloses a cavity 42. In the present embodiment, the housing 40 comprises a carrier substrate 44 and a cover 46. The carrier substrate 44 can be formed from silicon, while in contrast the cover 46 can be formed from a heterogeneous glass-silicon composite. In this manner, the cavity 42 can be closed using a wafer bonding method known per se under vacuum, for example, by glass frit soldering or anodic bonding.

Two encoder elements 2, which are fixed on the housing 40 via the restoring elements 14, are located inside the cavity 42.

In such micromechanical sensors, it is typical to excite the encoder elements 2 to oscillate in the direction of the movement 16 to be excited via capacitive comb drives known per se or via piezoelectric structures.

In the present example, the encoder element 2 is a capacitor plate, which forms a capacitance 49 in each case with a capacitor plate 48 formed as a readout element 48. For the sake of comprehensibility, the encoder elements 2 are referred to hereafter as encoder capacitor plates 2 and the readout elements 48 are referred to as readout capacitor plates 48. The readout capacitor plates 48 are fastened in parallel to the encoder capacitor plates 2 on the cover 46 in this case. A vertical distance 50 between encoder capacitor plate 2 and readout capacitor plate 48 corresponds to a capacitor plate spacing 50, of which only one is indicated in FIG. 3 for the sake of comprehensibility. The capacitor plate surface 52 of the encoder capacitor plates 2 and readout capacitor plates 48 define the capacitances 49 in this case together with the capacitor plate spacing 50.

To measure the capacitances 49, a readout voltage 54 is applied in each case between an encoder capacitor plate 2 and a readout capacitor plate 48.

For example, if the cover 46 bulges toward the rotation rate sensor 4 as a result of intrinsic or external tensions, the capacitor plate spacing 50 thus changes. In the event of rising temperatures, this capacitor plate spacing 50 could be enlarged, for example, which can be induced, for example, by the glass component in the cover 46, which has a greater coefficient of thermal expansion than the carrier substrate 44 made of silicon. By using polysilicon and/or other typical materials in micromechanics and/or by way of influences from assembly and packaging technology on the housing 40, however, the capacitor plate spacing 50 can also become less in the event of rising temperatures. The sign of the relationship between capacitor plate spacing 50 and temperature can also be dependent on the design of the rotation rate sensor 4 and the housing 40, for example, on the structure fixations and the design of the restoring elements 14.

The temperature dependence on the measurement result of the rotation rate sensor 4 can be substantially masked by means of the following considerations.

To be able to measure the capacitance 49 between the encoder capacitor plates 2 and the readout capacitor plates 48, as already explained, a readout voltage 54 must be applied to the capacitor plates 2, 48. This readout voltage 54 additionally exerts an electrostatic force along the direction of the Coriolis force 18 on the encoder capacitor plate 2, which reduces the spring constant of the overall oscillatory system.

A resonant frequency of the encoder capacitor plates 2 in the direction of the direction of the Coriolis force 18, referred to as the readout direction hereafter, is thus determined, on the one hand, by the mechanical natural resonance in the readout direction and, on the other hand, is reduced by the applied readout voltage 54. The readout direction is also to be provided hereafter with the reference sign 18 of the Coriolis force for better comprehensibility, since both point in the same direction.

If the capacitor plate spacing 50 now increases because of the thermal deformation, the capacitance 49 becomes less and therefore the electrostatic force also becomes less. This in turn causes an increase of the overall spring constant of the oscillatory system, which causes an increase of the resonant frequency of the encoder capacitor plates 2 in the readout direction 18. The resonant frequency in the direction of the excited movement 16, referred to as the excitation direction hereafter, remains unchanged, since the electrostatic force action acts along the readout direction 18 and therefore perpendicularly to the excitation direction. The excitation direction is also to be provided hereafter with the reference sign 16 of the excited movement 16 for better comprehensibility, since both point in the same direction.

However, due to the change of the resonant frequency in the readout direction 18, a differential frequency between the resonant frequency in the readout direction 18 and the resonant frequency in the movement direction 18 is also changed. As is known, for example, from DE 10 2010 002 796 A1, however, this differential frequency has a direct influence on the sensitivity of the rotation rate sensor 4. Therefore, if the capacitor plate spacing 50 increases as a result of tensions, the sensitivity of the rotation rate sensor 4 does sink in inverse proportion to the capacitor plate spacing 50, but it increases in the opposite direction due to a shrinking differential frequency, however, because the electrostatic force decreases and therefore the resonant frequency increases in the readout direction 18. The behavior is also observable in the case of decreasing capacitor plate spacing 50, since the sensitivity of the rotation rate sensor 4 increases due to the lower capacitor plate spacing 50, but it is simultaneously reduced again, since the differential frequency becomes greater.

The temperature-related errors and the temperature-related effects resulting therefrom on the sensitivity of the rotation rate sensor 4 thus mutually compensate for one another.

The resonant frequency in the readout direction 18, as set forth above, is established by the natural resonant frequency of the oscillatory system in the readout direction, which may be reduced by electrostatic forces as a result of the readout voltage, however. To implement the above-mentioned ideas and the compensation of the temperature-related effects in the rotation rate sensor 4, the readout voltage 50 can therefore be set so that the electrostatic force increases the differential frequency enough that the desired differential frequency results. To set the differential frequency independently of the applied readout voltage 50 between the encoder capacitor plate 2 and the readout capacitor plate 48, additional capacitors can also be applied, which can also be used, for example, to prevent the mechanical crosstalk between the excitation direction 16 and the readout direction 18.

Due to this in situ compensation of the sensitivity change, it is no longer necessary, for precise measurements of the angular velocity 8, to implement complex compensation methods in a signal analysis circuit connected to the rotation rate sensor 4 and to reconcile using a large number of temperature support points, for example, via complexly developed characteristic curves. In the ideal case, if the resonant frequency in the excitation direction 16 is precisely adapted to the resonant frequency in the readout direction 18, a calibration of the sensitivity of the rotation rate sensor 4 via the temperature can be omitted.

The above-described in situ compensation of the temperature errors is very robust with variation of the determining factors, such as the resonant frequencies in the excitation direction 16 and the readout direction 18, the applied readout voltage 54, etc. A sensitivity drift of at most ±5% can already be achieved, without additional complex compensation mechanisms being necessary in the ASIC, for example, additional controllers, a calibration of the sensitivity drift of the rotation rate sensor 4 via temperature, or a general polynomial reconciliation of the sensitivity drift, wherein the temperature is measured by a temperature sensor. Sensitivity drifts of at most ±3% would also be possible without problems in this case, however.

However, the above-mentioned compensation mechanisms can further increase the temperature stability of the rotation rate sensor 4, so that the rotation rate sensor 4 can also be used for high-precision applications.

Furthermore, the option exists of considering additional effects when setting the operating point: on the basis of the change of the elastic coefficients over temperature, the two resonant frequencies in the excitation direction 16 and in the readout direction 18 can vary over temperature. Also, on the basis of different chucking conditions over temperature, the possibly existing pre-tension of the restoring elements 14 can change, which can result in a shift of the resonant frequencies in the excitation direction 16 and in the readout direction 18. If these relationships are known and are to be approximately described by a function, the pre-tension can thus be set so that the sensitivity drift is also minimal under these variable conditions.

To at least test the reconciliation of the temperature-related errors in the resonant frequency in the readout direction 18 and the temperature-related errors of the capacitor plate spacing 50 beforehand by computer, the following formula has proven to be helpful:

$$\Delta \hat{C} \approx \frac{\Omega x_0}{2\pi \Delta f d} C_s(0),$$

Therein, in addition to constants which are known per se, $\Delta \hat{C}$ corresponds to the change of the capacitance 49 between the encoder capacitor plate 2 and the readout capacitor plate 48 as a result of the movement of the encoder capacitor plate 2 in the readout direction, $\Delta f$ corresponds to the differential frequency between the resonant frequency in the readout direction 18 and the resonant frequency in the excitation direction 16, $\Omega$ corresponds to the angular velocity 8, $x_0$ corresponds to the amplitude of the oscillation of the encoder capacitor plate 2 in the movement direction 16, d corresponds to the capacitor plate spacing 50, and $C_s(0)$ corresponds to the open-circuit capacitance of the capacitance 49.

In this formula, the term $$\frac{C_S(0)}{\Delta f d}$$

is to be kept temperature-independent.

The invention claimed is:
1. A sensor for detecting a rotation rate of an object comprising:

a capacitive encoder element configured to oscillate at an angle to an axis of rotation of the rotation rate to be detected at an excitation frequency on a restoring element fastened in a stationary manner on the object, so that the capacitive encoder element is deflected, as a result of a Coriolis force, at the angle to the axis of rotation and at an angle to an oscillation direction in a reaction direction at a reaction frequency, a capacitive readout plate positioned in proximity to the capacitive encoder element, the capacitive readout plate exerting an electrostatic force on the capacitive encoder element so that the capacitive encoder element is further deflected at the angle to the axis of rotation, the electrostatic force generated by a readout voltage applied to the capacitive readout plate, and a measurement pickup, which is configured to detect an oscillation in the reaction direction, wherein the readout voltage is generated to have a value based on a comparison of a temperature-dependent differential frequency between the excitation frequency and the reaction frequency.

2. The sensor as claimed in claim 1, wherein the predetermined condition comprises an observation of the comparison in an approximation.

3. The sensor as claimed in claim 2, wherein the predetermined condition comprises an error interval, in which the approximated comparison must fall within a predetermined temperature range.

4. The sensor as claimed in claim 1, wherein the encoder element is a capacitance electrode, which oscillates in the reaction direction in relation to a further capacitance electrode, wherein the measurement pickup is configured to detect the oscillation in the reaction direction based on a capacitance between the two capacitance electrodes.

5. The sensor as claimed in claim 4, wherein the restoring element has a spring constant, which is dependent on an electrical voltage between the two capacitance electrodes.

6. The sensor as claimed in claim 5, wherein the electrical voltage is set such that the comparison meets the predetermined condition.

7. The sensor as claimed in claim 4, wherein the reaction oscillation induces a change $\Delta \hat{C}$ of the capacitance between the two capacitance electrodes with $\Delta f$ as the frequency interval, $\Omega$ as the rotation rate, $x_0$ as the amplitude of the oscillation at the excitation frequency, d as the spacing of the capacitance electrodes, and $C_s(0)$ as the open-circuit capacitance between the two capacitance electrodes, which meets the following condition in a first approximation $$\Delta \hat{C} \approx \frac{\Omega x_0}{2\pi \Delta f d} C_s(0),$$

and wherein, as a predetermined condition, the term $$\frac{C_S(0)}{\Delta f d}$$

is less in a predetermined temperature range than a predetermined error threshold.

8. A method for detecting a rotation rate of an object using a capacitive encoder element, which is configured to oscillate at an angle to an axis of rotation of the rotation rate to be detected at an excitation frequency on a restoring element, which is fastened in a stationary manner on the object, so that the capacitive encoder element is deflected, as a result of a Coriolis force, at the angle to the axis of rotation and at an angle to an oscillation direction in a reaction direction at a reaction frequency, comprising:

exerting, by a capacitive readout plate positioned in proximity to the capacitive encoder element, an electrostatic force on the capacitive encoder element so that the capacitive encoder element is further deflected at the angle to the axis of rotation, the electrostatic force generated by a readout voltage applied to the capacitive readout plate, detecting an oscillation in the reaction direction, determining the rotation rate based on the detected oscillation, and wherein the readout voltage is generated to have a value based on a comparison of a temperature-dependent differential frequency between the excitation frequency and the reaction frequency.

9. A control device for carrying out a method for detecting a rotation rate of an object using a capacitive encoder element, which is configured to oscillate at an angle to an axis of rotation of the rotation rate to be detected at an excitation frequency on a restoring element, which is fastened in a stationary manner on the object, so that the capacitive encoder element is deflected, as a result of a Coriolis force, at the angle to the axis of rotation and at an angle to an oscillation direction in a reaction direction at a reaction frequency, comprising:

exerting, by a capacitive readout plate positioned in proximity to the capacitive encoder element, an electrostatic force on the capacitive encoder element so that the capacitive encoder element is further deflected at the angle to the axis of rotation, the electrostatic force generated by a readout voltage applied to the capacitive readout plate, detecting an oscillation in the reaction direction, determining the rotation rate based on the detected oscillation, and wherein the readout voltage is generated to have a value based on a comparison of a temperature-dependent differential frequency between the excitation frequency and the reaction frequency.

10. The sensor as claimed in claim 5, wherein the reaction oscillation induces a change $\Delta \hat{C}$ of the capacitance between the two capacitance electrodes with $\Delta f$ as the frequency interval, $\Omega$ as the rotation rate, $x_0$ as the amplitude of the oscillation at the excitation frequency, d as the spacing of the capacitance electrodes, and $C_s(0)$ as the open-circuit capacitance between the two capacitance electrodes, which meets the following condition in a first approximation $$\Delta \hat{C} \approx \frac{\Omega x_0}{2\pi \Delta f d} C_s(0),$$

and wherein, as a predetermined condition, the term $$\frac{C_S(0)}{\Delta f d}$$

is less in a predetermined temperature range than a predetermined error threshold.

11. The sensor as claimed in claim 6, wherein the reaction oscillation induces a change $\Delta \hat{C}$ of the capacitance between the two capacitance electrodes with $\Delta f$ as the frequency interval, $\Omega$ as the rotation rate, $x_0$ as the amplitude of the oscillation at the excitation frequency, d as the spacing of the capacitance electrodes, and $C_s(0)$ as the open-circuit capacitance between the two capacitance electrodes, which meets the following condition in a first approximation $$\Delta \hat{C} \approx \frac{\Omega x_0}{2\pi \Delta f d} C_s(0),$$

and wherein, as a predetermined condition, the term $$\frac{C_S(0)}{\Delta f d}$$

is less in a predetermined temperature range than a predetermined error threshold.

* * * * *